UNITED STATES PATENT OFFICE.

GEORG LOWENBERG, OF BERLIN, GERMANY.

COMPOSITION OF MATTER FOR USE IN MANUFACTURING GLOW BODIES FOR INCANDESCENT LAMPS.

SPECIFICATION forming part of Letters Patent No. 568,780, dated October 6, 1896.

Application filed June 2, 1896. Serial No. 594,010. (No specimens.)

*To all whom it may concern:*

Be it known that I, GEORG LOWENBERG, a subject of the German Emperor, residing at Berlin, Germany, have invented a new and useful Composition of Matter to be Used for Manufacturing Glow Bodies for Incandescent Lamps, of which the following is a specification.

I have discovered that the metals of the gold group, as the oxids of palladium, iridium, osmium, ruthenium, rhodium, and the like, combined with thorium, have a high light-radiating power and therefore are well adapted for incandescent-lighting purposes, and I have particularly found that the said oxids, and some of them in a prominent degree, when used together with the well-known combination of thorium and cerium, as in the Auer glow bodies, even in a small quantity, will replace much more than an equal quantity of oxid of cerium. If, therefore, for instance, to attain a given lighting effect by the common Auer body there should be needed, say, ninety-eight per cent. of thorium oxid and two per cent. of cerium oxid when substituting for, say, one-fifth per cent. of cerium oxid a similar quantity of oxid of rhodium, for instance, in accordance with my invention the quantity of cerium oxid required to attain the same lighting effect will be reduced from one and four-fifths per cent. (which quantity should remain in case of a mere substitution,) to one per cent.—*i. e.*, to nearly a half.

Although I have illustrated my invention by an example in which only one of the above-mentioned metals is used, together with thorium and cerium, I do not confine it thereto, as similar effects are attained by using any combination of two or more of the same.

I am not aware that prior to my invention a composition of thorium and cerium, in combination with metals of aurates, has been used for manufacturing glow bodies for incandescent lamps.

What I claim, and desire to secure by Letters Patent of the United States, is—

The herein-described composition of matter to be used for manufacturing glow bodies for incandescent lamps, consisting of a combination of the oxids of thorium and cerium with one or more of the oxids of the gold group, as palladium, iridium, osmium, ruthenium, rhodium and the like.

In witness whereof I have hereunto signed my name in the presence of two subscribing witnesses.

GEORG LOWENBERG.

Witnesses:
W. HAUPT,
CHARLES H. DAY.